(12) United States Patent
Butz et al.

(10) Patent No.: US 12,196,458 B2
(45) Date of Patent: Jan. 14, 2025

(54) INTRODUCTION OF $CO_2$ INTO THERMAL WATER

(71) Applicant: L'Air Liquide, Société Anonyme pour l'Etude et l'Exploitation des Procédés Georges Claude, Paris (FR)

(72) Inventors: Ulrich Butz, Krefeld (DE); Felix Borchert, Traunreut (DE)

(*) Notice: Subject to any disclaimer, the term of this patent is extended or adjusted under 35 U.S.C. 154(b) by 552 days.

(21) Appl. No.: 17/003,198

(22) Filed: Aug. 26, 2020

(65) Prior Publication Data

US 2021/0063056 A1 Mar. 4, 2021

(30) Foreign Application Priority Data

Aug. 29, 2019 (DE) .......................... 102019123177.9

(51) Int. Cl.
| | | |
|---|---|---|
| *F24T 10/20* | (2018.01) | |
| *C02F 1/66* | (2023.01) | |
| *F03G 7/04* | (2006.01) | |
| *F24T 10/00* | (2018.01) | |

(52) U.S. Cl.
CPC ................ *F24T 10/20* (2018.05); *C02F 1/66* (2013.01); *F03G 7/04* (2013.01); *C02F 2209/02* (2013.01); *C02F 2209/03* (2013.01); *C02F 2209/06* (2013.01); *C02F 2209/40* (2013.01); *C02F 2303/22* (2013.01); *F24T 2010/56* (2018.05); *Y02E 10/10* (2013.01)

(58) Field of Classification Search
None
See application file for complete search history.

(56) References Cited

U.S. PATENT DOCUMENTS

| | | | | |
|---|---|---|---|---|
| 3,982,592 | A | * 9/1976 | Hamrick | ................ E21B 36/02 |
| | | | | 166/302 |
| 4,211,613 | A | * 7/1980 | Meckler | ................ E21B 43/40 |
| | | | | 299/5 |

(Continued)

FOREIGN PATENT DOCUMENTS

| | | |
|---|---|---|
| AT | 411 677 | 4/2004 |
| CH | 710 999 | 10/2016 |

(Continued)

OTHER PUBLICATIONS

JP-H08327259-A, English Language Machine Translation (Year: 1996).*

(Continued)

*Primary Examiner* — Wesley G Harris
(74) *Attorney, Agent, or Firm* — Yan Jiang

(57) ABSTRACT

A method comprising introducing $CO_2$ into thermal water (2) in an underground reservoir (3) designated and suitable for the geothermal generation of energy, wherein the $CO_2$ is discharged from a nozzle (4) and introduced into the thermal water (2) at a discharge flow velocity, wherein the discharge flow velocity
 is above a lower limit value which is selected in such a way that backflow of the thermal water (2) into the nozzle (4) is prevented, and
 is below an upper limit value which is selected in such a way that stripping of $CO_2$ dissolved in the thermal water (2) is prevented.

19 Claims, 1 Drawing Sheet

(56) References Cited

U.S. PATENT DOCUMENTS

| | | | | |
|---|---|---|---|---|
| 5,685,362 | A | * 11/1997 | Brown | F24T 10/20 |
| | | | | 165/45 |
| 2011/0219769 | A1 | * 9/2011 | Weres | C02F 5/00 |
| | | | | 60/641.1 |
| 2013/0026105 | A1 | 1/2013 | Duarte et al. | |
| 2013/0043678 | A1 | * 2/2013 | Saar | F02C 1/10 |
| | | | | 165/45 |
| 2017/0248333 | A1 | * 8/2017 | Varley | F28D 9/005 |
| 2018/0135892 | A1 | 5/2018 | Von Düring | |
| 2018/0171768 | A1 | 6/2018 | Tiffany, III et al. | |

FOREIGN PATENT DOCUMENTS

| | | | | |
|---|---|---|---|---|
| EP | 3 115 712 | | 1/2017 | |
| JP | S60 235699 | | 11/1985 | |
| JP | H08327259 | A | * 12/1996 | F28D 15/02 |

OTHER PUBLICATIONS

European Search Report for corresponding EP 20193119.3, Dec. 4, 2020.

\* cited by examiner

INTRODUCTION OF CO₂ INTO THERMAL WATER

CROSS REFERENCE TO RELATED APPLICATIONS

This application claims priority to German Patent Application No, 10 2019 123 177.9, filed Aug. 29, 2019, the entire contents of which are incorporated herein by reference.

TECHNICAL FIELD

The present invention relates to a method comprising introducing $CO_2$ into thermal water in an underground reservoir designated and suitable for a geothermal generation of energy.

BACKGROUND

It is known from the prior art to use geothermal heat for energy generation. For instance, the heat from thermal water is utilized within the scope of geothermal energy use. In this case, thermal water is understood to be naturally occurring groundwater having a temperature of at least 20° C. Thermal water can be pumped out of the ground via pipelines. Using, by way of example, a heat exchanger, this heat can be used for a very wide variety of purposes. In particular, a residential building can be heated by means of the heat extracted from the thermal water.

Thermal water typically contains $CO_2$ in the form of carbonic acid. When pumping out thermal water from an underground reservoir, the thermal water is mechanically stressed. In particular, the thermal water is regularly exposed to moving parts of pumps and is passed through pipelines. The carbonic acid in the thermal water may be broken down as a result of such mechanical stress and gaseous $CO_2$ may escape. This is akin to the process of shaking a bottle of carbonated mineral water. The escape of the $CO_2$ causes a chemical equilibrium in the thermal water to be shifted. This results in the formation of limescale. These can clog, and in the worst case block, the pumps and pipelines used for the geothermal generation of energy.

Deposits of this kind can in principle be removed mechanically. However, in particular in the case of underground components, this is associated with considerable expense and is often even impossible. Frequently, all that remains is thus the replacement of affected components.

SUMMARY

On account of the comparatively high solubility of $CO_2$ in water, $CO_2$ is particularly well suited for shifting the equilibrium reactions with minerals in the direction of complete solids conversion. This means that occurrences of precipitation can within certain limits be prevented.

Taking this as a basis, it is the object of the present invention to solve or at least alleviate the technical problems described in connection with the prior art. The intention is in particular to present a method and an apparatus with which deposits during the geothermal generation of energy can be prevented or at least reduced in a manner better than that to date.

These objects are achieved by methods and apparatuses according to the features of the independent patent claims. Further advantageous configurations are specified in the respectively dependently formulated patent claims. The features specified individually in the patent claims can be combined with one another in any technologically reasonable way and may be supplemented by explanatory facts from the description in which further embodiment variants of the invention are presented.

According to the invention, a method is presented which comprises the introduction of $CO_2$ into thermal water in an underground reservoir designated and suitable for the geothermal generation of energy. The $CO_2$ is discharged from a nozzle and introduced into the thermal water in the gaseous state at a discharge flow velocity, wherein the discharge flow velocity

- is above a lower limit value which is selected in such a way that backflow of the thermal water into the nozzle is prevented, and
- is below an upper limit value which is selected in such a way that stripping of $CO_2$ dissolved in the thermal water is prevented.

Using the method described it is possible to compensate for the fact that during the geothermal generation of energy carbonic acid is released from the thermal water on account of the mechanical stresses described in relation to the prior art and escapes in the form of gaseous $CO_2$. In order to avoid the accompanying shift of the chemical equilibrium and the resulting formation of deposits, $CO_2$ can be introduced into the thermal water with the method described. The $CO_2$ which is missing from the thermal water on account of the mechanical stresses can therefore be replaced.

By way of the upper and the lower limit value, it is possible to ensure that $CO_2$ can be introduced into the thermal water under varying conditions without undesired deposits arising. To this end, the system is balanced so that a stable but dynamic pressure ratio is maintained between the thermal water and the actual $CO_2$ pressure in the nozzle opening.

The method described can be applied to any underground reservoir designated and suitable for the geothermal generation of energy, "Geothermal generation of energy" is to be understood to mean the utilization of geothermal heat. The method described is applicable to the geothermal generation of energy using thermal water. In this case, thermal water is understood to be naturally occurring groundwater having a temperature of at least 20° C. Thermal water may in particular be present as a brine, that is to say as an aqueous solution of salts. A reservoir which is designated and suitable for the geothermal generation of energy within the meaning used here is at least partially filled with thermal water. The reservoir is located underground, that is to say beneath the surface of the earth. The reservoir may for example be a void within the ground. However, it is not necessary that the reservoir be a free space that is only filled with the thermal water. For instance, the reservoir may by way of example also be in the form of porous rock in which the thermal water is located. The reservoir is preferably a natural reservoir. A reservoir which is designated and suitable for the geothermal generation of energy within the meaning used here is moreover provided with components, such as for example pipelines and at least one pump, which are designated and suitable for the geothermal generation of energy. An as-yet unexploited reservoir can consequently not be considered designated and suitable for the geothermal generation of energy.

The thermal water can preferably be conveyed out of the reservoir via a first pipeline and supplied by way of example to a heat exchanger. The thermal water can subsequently be returned back into the reservoir by a second pipeline. As an alternative, a single pipeline may also be used, for example in that the thermal water is conveyed out of the reservoir and returned back into it in alternating fashion via the pipeline.

The geothermal generation of energy is not part of the method described here. In particular, the conveying of thermal water out of the reservoir, the passage of the thermal water through a heat exchanger and the returning of the thermal water into the reservoir are not part of the method described.

The method described introduces $CO_2$ into the thermal water. This preferably takes place in the reservoir. The first contact between $CO_2$ and thermal water occurs in this case in the reservoir and thus underground. To this end, a nozzle is arranged within the reservoir or directly adjoining the reservoir, from which the $CO_2$ can be discharged and introduced into the thermal water. The nozzle is consequently likewise arranged underground. The nozzle is preferably designed as a two-phase nozzle. As an alternative or in addition to the introduction of the $CO_2$ into the reservoir, in which the $CO_2$ comes into contact with the thermal water within the reservoir, it is preferable for the $CO_2$ to be introduced into a conveying line. In that case, the first contact between $CO_2$ and thermal water occurs in the conveying line, preferably at a location underground, especially at a point where the conveying line joins the reservoir.

The flow velocity at which the $CO_2$ is discharged from the nozzle is referred to as the discharge flow velocity. In the method described, the $CO_2$ flow is preferably controlled, in particular in such a way that the discharge flow velocity is between the lower and the upper limit value at all times.

The lower limit value is selected in such a way that backflow of the thermal water into the nozzle is prevented. "Back flow" is understood to mean the case in which the thermal water from the reservoir enters the nozzle counter to the flow direction of the $CO_2$. Such backflow can in particular occur on account of adhesion and as a result of a change in local pressure ratios. The result of such backflow may be occurrences of precipitation in the nozzle which can block the nozzle.

The lower limit value can be determined experimentally. For example, the discharge flow velocity above which precisely no backflow occurs over a predetermined time span can be determined experimentally. The discharge flow velocity thus determined can be used as an lower limit value.

The upper limit value is selected in such a way that stripping of $CO_2$ dissolved in the thermal water is prevented. The term "stripping", known from chemistry, is understood to mean that constituents are removed from a liquid by passing a gas through and are transferred into the gas. Stripping can also be referred to as driving out. Were the $CO_2$ to be introduced into the thermal water at an excessively high flow velocity, the $CO_2$ gas flow could lead to a stripping of constituents of the thermal water, especially the $CO_2$ dissolved therein. In this case, both the gas passed through the liquid and the constituent removed from the liquid and transferred into the gas would be $CO_2$. The stripping of $CO_2$ from the thermal water can lead to deposits. In particular, the nozzle may close up in the direction of a nozzle opening as a result of such deposits.

The upper limit value can be determined experimentally. For example, the discharge flow velocity below which precisely no stripping of $CO_2$ from the thermal water occurs over a predetermined time span can be determined experimentally. The discharge flow velocity thus determined can be used as an upper limit value.

The lower limit value and/or the upper limit value may be predefined as fixed numerical values. However, it is preferable for the lower limit value and/or the upper limit value to be adapted dynamically to changing circumstances. For instance, it is preferable for the lower limit value and/or the upper limit value to be determined at predetermined intervals of time on the basis of measurements made on the thermal water.

The $CO_2$ introduction makes it possible to reduce the $CO_2$ loss due to mechanical stresses, so that the formation of the corresponding deposits can be reduced. By way of selection of the discharge flow velocity between the lower and the upper limit value, there are particularly few deposits here due to the $CO_2$ introduction.

According to a preferred embodiment of the method, the lower limit value is in the range from 1.5 to 2.5 m/s. The lower limit value is preferably 2.0 m/s.

It has been found that backflow of the thermal water into the nozzle can be sufficiently prevented with a lower limit value in the specified range.

According to a further preferred embodiment of the method, the upper limit value is in the range from 9.0 to 14.0 m/s. The upper limit value is preferably 10.5 m/s.

It has been found that stripping of the $CO_2$ dissolved in the thermal water can be sufficiently prevented with an upper limit value in the specified range.

A method is also presented which comprises the introduction of $CO_2$ into thermal water in an underground reservoir designated and suitable for the geothermal generation of energy, wherein the $CO_2$ is discharged from a nozzle and introduced into the thermal water at a discharge flow velocity, wherein the discharge flow velocity is above a lower limit value of 2.0 m/s, and
is below an upper limit value of 10.5 m/s.

According to a further preferred embodiment of the method, the discharge flow velocity is controlled while taking at least one of the following properties of the thermal water into account:
a temperature,
a pH,
a composition,
a flow velocity,
a pressure.

The temperature, the pH and the composition of the thermal water can influence the solubility of $CO_2$ in the thermal water. The composition indicates which substances are present at which concentration in the thermal water. Possible substances include, in particular, salts.

The flow velocity of the thermal water may differ in terms of absolute value and direction at different points in the reservoir and/or for example in pipelines. The discharge flow velocity is preferably controlled while taking into account the absolute value of the flow velocity in a pipeline for conveying the thermal water out of the reservoir. This parameter is a measure of the thermal stresses on the thermal water due to the geothermal generation of energy and thus is a measure of how much $CO_2$ is released and is intended to be replaced by the method described.

The pressure of the thermal water may differ at different points in the reservoir and/or for example in pipelines. The discharge flow velocity is preferably controlled while taking into account the pressure of the thermal water in a pipeline for conveying the thermal water out of the reservoir. This parameter is a further measure of the thermal stresses on the thermal water due to the geothermal generation of energy.

The respective properties of the thermal water are preferably measured continuously or quasi-continuously in order to be able to be taken into account in the control. The properties are preferably taken into account in the control as disturbance variables, in particular within the context of disturbance variable feedforward control.

According to a further preferred embodiment of the method, the discharge flow velocity is controlled while taking at least one of the following properties of the nozzle into account:
- a geometry,
- a material,
- surface characteristics.

In particular, the geometry taken into account is preferably the geometry of the nozzle exit. There are preferably no dead zones or sharp separation edges in the interior of the nozzle.

In particular, the material of the nozzle taken into account is preferably the parts of the nozzle that come into contact with the $CO_2$ to be discharged. This material is preferably insusceptible with regard to adhesions and abrasion. By way of example, high-alloy steel with titanium is particularly suitable.

In particular, the surface characteristics taken into account are preferably the surface characteristics of the surfaces of the nozzle over which the $CO_2$ flows. Such areas over which gas flows have preferably been adjusted to a roughness Ra of 0.25 to 0.6 by electropolishing.

According to a further preferred embodiment of the method, the discharge flow velocity is controlled using the Langelier index of the thermal water as controlled variable.

The Langelier index is a measure of the corrosiveness of water. The Langelier index can be modified by way of the introduction of $CO_2$. It is preferable for the $CO_2$ introduction to be proportioned so that the Langelier index is in a predetermined range, for example from −0.3 to +0.3.

The controlled variable is the variable which is to be brought to a determined setpoint value by the control. The setpoint value can be considered to be an instantaneous value of a reference variable. A course of the Langelier index over time or a setpoint value that is constant over time may be predefined as reference variable for the Langelier index.

As a further aspect of the invention, a method for the geothermal generation of energy is presented, which comprises:
a) conveying thermal water out of an underground reservoir designated and suitable for the geothermal generation of energy,
b) passing the thermal water that has been conveyed as per step a) through a heat exchanger,
c) returning the thermal water that has been passed through the heat exchanger as per step b) into the reservoir.
wherein $CO_2$ is introduced into the reservoir by a method according to any of the preceding embodiments.

The advantages and preferred configuration features of the previously described method comprising the introduction of $CO_2$ into thermal water are applicable and transferable to the method described here for the geothermal generation of energy, and vice versa.

In contrast to the method described previously, the geothermal generation of energy is part of the method described here. Steps a) to c), which are preferably carried out in the form of a cycle, serve this purpose. The introduction of the $CO_2$ is temporally independent of the geothermal generation of energy. For instance, $CO_2$ can be introduced before, during and/or after steps a) to c) have been carried out. Preferably, $CO_2$ is introduced continuously during steps a) to c). It is also possible to introduce $CO_2$ only as needed and only to the extent required, for example if a measurement shows that the Langelier index is outside of a predefined range, for example from −0.3 to +0.3.

As a further aspect of the invention, an apparatus is presented for the introduction of $CO_2$ into thermal water in an underground reservoir designated and suitable for the geothermal generation of energy. The apparatus comprises:
a nozzle for introducing the $CO_2$ into the thermal water, and
a control device which is configured to control a discharge flow velocity at which the $CO_2$ is discharged from the nozzle and introduced into the thermal water in such a way that the discharge flow velocity
is above a lower limit value which is selected in such a way that backflow of the thermal water into the nozzle is prevented, and
is below an upper limit value which is selected in such a way that stripping of $CO_2$ dissolved in the thermal water is prevented.

The advantages and preferred configuration features of the two methods described previously are applicable and transferable to the apparatus, and vice versa. It is in particular preferable for the method comprising the introduction of $CO_2$ into thermal water to be carried out using the apparatus described. The apparatus is preferably designated and configured for carrying out the method comprising the introduction of $CO_2$ into thermal water. In the method described for the geothermal generation of energy, the $CO_2$ is preferably introduced into the reservoir by means of the apparatus described. The apparatus is preferably designated and configured for the introduction of the $CO_2$ in the described method for the geothermal generation of energy.

The invention and the technical field will be explained in more detail hereinbelow on the basis of the figures.

BRIEF DESCRIPTION OF THE DRAWINGS

The figures show particularly preferred exemplary embodiments, however, the invention is not limited to these. It should be pointed out in particular that the figures and especially the scales illustrated are only schematic. In the figures, schematically.

DESCRIPTION OF THE PREFERRED EMBODIMENTS

Figure 1:
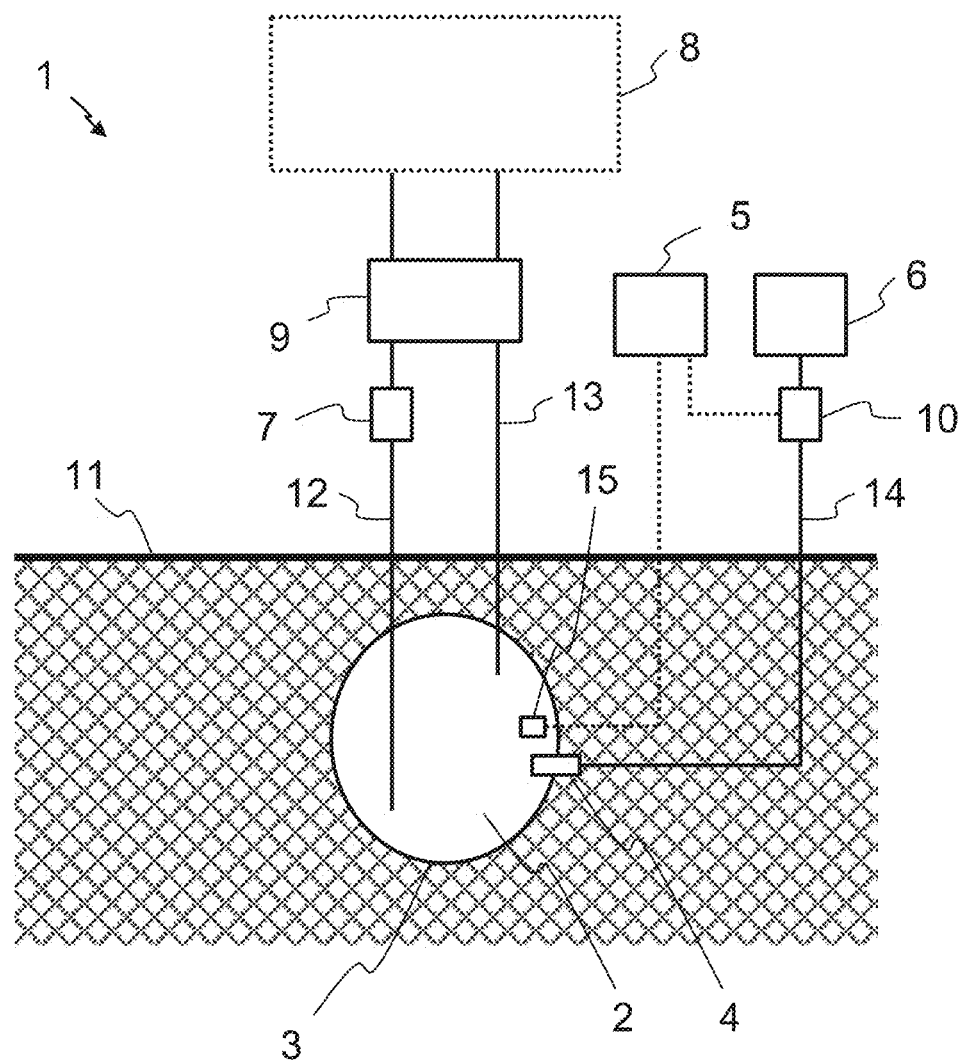
FIG. 1 shows a visualization of an inventive method comprising the introduction of $CO_2$ into thermal water in an underground reservoir designated and suitable for the geothermal generation of energy using an inventive apparatus.

FIG. 1 shows an underground reservoir 3, that is to say one beneath a surface of the earth 11. Thermal water 2 is present in the reservoir 3. The reservoir 3 is designated and suitable for the geothermal generation of energy. It should be noted that FIG. 1 is schematic, especially with respect to the form of the reservoir 3.

Via a first pipeline 12, the thermal water 2 can be pumped out of the reservoir 3 with a pump 7 and passed to a heat exchanger 9. In the heat exchanger 9 the thermal water 2 can at least partially release its heat, for example to a heat transfer medium. A heat consumer 8 can be supplied with heat using the heat transfer medium that has been heated in the heat exchanger 9, in that the heat transfer medium is circulated through a circuit including the heat exchanger 9 and the heat consumer 8. For instance, a residential building can for example be heated as heat consumer 8. The thermal water 2 can be passed from the heat exchanger 9 back into the reservoir 3 via a second pipeline 13.

$CO_2$ can be introduced into the thermal water 2 in the reservoir 3 via a nozzle 4. The nozzle 4 is connected to a $CO_2$ storage tank 6 via a third pipeline 14. The third pipeline 14 has a $CO_2$ regulator 10 which may in particular be a valve. The $CO_2$ flow can be controlled using the $CO_2$ regulator 10 in such a way that the $CO_2$ is discharged from the nozzle 4 and introduced into the thermal water 2 at a discharge flow velocity which
- is above a lower limit value which is selected in such a way that backflow of the thermal water 2 into the nozzle 4 is prevented, and
- is below an upper limit value which is selected in such a way that stripping of $CO_2$ dissolved in the thermal water 2 is prevented.

This control can be carried out by means of a control device 5 which is connected at least to the $CO_2$ regulator 10 and to a sensor unit 15 in the reservoir 3. The connection is preferably implemented digitally. The sensor unit 3 can be used to measure the following properties of the thermal water 2, so that these properties may be taken into account in the control:
- a temperature,
- a pH,
- a composition,
- a flow velocity,
- a pressure.

The nozzle 4 and the control device 5 are in particular part of an apparatus 1. In the exemplary embodiment shown, the $CO_2$ storage tank 6, the pump 7, the heat exchanger 9, the $CO_2$ regulator 10, the pipelines 11, 12, 13 and the sensor unit 15 are also part of the apparatus 1.

Figure 2:
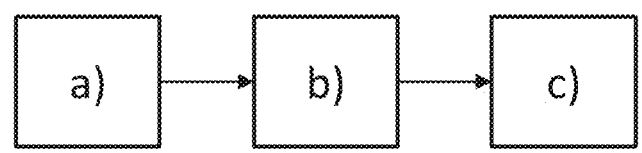
FIG. 2 shows a flowchart of an inventive method for the geothermal generation of energy.

FIG. 2 shows a flowchart of an inventive method for the geothermal generation of energy. The method can be carried out using what is shown in FIG. 1 and is described using the reference symbols from FIG. 1. The method comprises:
a) conveying thermal water 2 out of an underground reservoir 3 designated and suitable for the geothermal generation of energy,
b) passing the thermal water 2 that has been conveyed as per step a) through a heat exchanger 9,
c) returning the thermal water 2 that has been passed through the heat exchanger 9 as per step b) into the reservoir 3, wherein $CO_2$ is introduced into the reservoir 3 by a method according to any of the preceding embodiments.

Using the described method and the described apparatus 1, thermal water 2 can be used for the geothermal generation of energy, with particularly few undesired deposits arising on the components used for this purpose. In order to compensate for a $CO_2$ deficit in the thermal water 2, occurring on account of mechanical stresses, $CO_2$ is introduced into the thermal water 2. This involves controlling a discharge flow velocity at which the $CO_2$ is discharged from a nozzle 4 and introduced into the thermal water 2.

LIST OF REFERENCE SIGNS

1 Apparatus
2 Thermal water
3 Reservoir
4 Nozzle
5 Control device
6 $CO_2$ storage tank
7 Pump
8 Heat consumer
9 Heat exchanger
10 $CO_2$ regulator
11 Surface of the earth
12 First pipeline
13 Second pipeline
14 Third pipeline
15 Sensor unit While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

As used herein, "about" or "around" or "approximately" in the text or in a claim means±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

All references identified herein are each hereby incorporated by reference into this application in their entireties, as well as for the specific information for which each is cited.

What is claimed is:

1. A method comprising:
introducing $CO_2$ into a thermal water (2) in an underground reservoir (3) designated and suitable for a geothermal generation of energy, wherein the $CO_2$ is discharged from a nozzle (4) and introduced into the thermal water (2) in a gaseous state at a discharge flow velocity, wherein the discharge flow velocity
is above a lower limit value which is selected in such a way that backflow of the thermal water (2) into the nozzle (4) is prevented, and
is below an upper limit value which is selected in such a way that the driving out of the $CO_2$ dissolved in the thermal water (2), related to the mechanical stress suffered by the thermal water during the geothermal generation of energy, is prevented, by maintaining a stable but dynamic pressure ratio between the thermal water and the $CO_2$ pressure in a nozzle opening, and
controlling the discharge flow velocity of the $CO_2$ while taking into account an absolute value of a flow velocity of the thermal water (2) in a pipeline (12) for conveying the thermal water (2) out of the underground reservoir (3).

2. The method according to claim 1, wherein the lower limit value is in a range from 1.5 to 2.5 m/s.

3. The method according to claim 1, wherein the upper limit value is in a range from 9 to 14 m/s.

4. The method according to claim 1, wherein the discharge flow velocity is controlled while taking at least one of the following properties of the thermal water (2) into account:
a temperature,
a pH,
a composition,
a pressure.

5. The method according to claim 1, wherein the discharge flow velocity is controlled while taking at least one of the following properties of the nozzle (4) into account:
a geometry,
a material,
surface characteristics.

6. The method according to claim 1, wherein the discharge flow velocity is controlled using the Langelier index of the thermal water (2) as a controlled variable.

7. A method for producing a geothermal generation of energy, comprising the steps of:
a) conveying thermal water (2) out of an underground reservoir (3) designated and suitable for the geothermal generation of energy;
b) passing the thermal water (2) that has been conveyed as per step a) through a heat exchanger (9); and
c) returning the thermal water (2) that has been passed through the heat exchanger (9) as per step b) into the underground reservoir (3),
wherein $CO_2$ is introduced into the underground reservoir (3),
wherein the $CO_2$ is discharged from a nozzle (4) and introduced into the thermal water (2) in a gaseous state at a discharge flow velocity, and
d) controlling the discharge flow velocity of the $CO_2$ while taking into account an absolute value of a flow velocity of the thermal water (2) in a pipeline (12) for conveying the thermal water (2) out of the underground reservoir (3).

8. The method according to claim 7, wherein the discharge flow velocity
is above a lower limit value which is selected in such a way that backflow of the thermal water (2) into the nozzle (4) is prevented, and
is below an upper limit value which is selected in such a way that stripping of the $CO_2$ dissolved in the thermal water (2) is prevented.

9. The method according to claim 8, wherein the lower limit value is in a range from 1.5 to 2.5 m/s.

10. The method according to claim 8, wherein the upper limit value is in a range from 9 to 14 m/s.

11. The method according to claim 8, wherein the discharge flow velocity is controlled while taking at least one of the following properties of the thermal water (2) into account:
a temperature,
a pH,
a composition,
a pressure.

12. The method according to claim 8, wherein the discharge flow velocity is controlled while taking at least one of the following properties of the nozzle (4) into account:
a geometry,
a material,
surface characteristics.

13. The method according to claim 8, wherein the discharge flow velocity is controlled using the Langelier index of the thermal water (2) as a controlled variable.

14. An apparatus (1) for introducing $CO_2$ into thermal water (2) in an underground reservoir (3) designated and suitable for a geothermal generation of energy, comprising:
a nozzle (4) for introducing the $CO_2$ into the thermal water (2); and
a control device (5), connected to at least a $CO_2$ regulator and a sensor in the underground reservoir, configured to control a discharge flow velocity at which the $CO_2$ is discharged from the nozzle (4) and introduced into the thermal water (2) in a gaseous state at the discharge flow velocity wherein the discharge flow velocity
is above a lower limit value which is selected in such a way that backflow of the thermal water (2) into the nozzle (4) is prevented, and
is below an upper limit value which is selected in such a way that the driving out of the $CO_2$ dissolved in the thermal water (2), related to the mechanical stress suffered by the thermal water during the geothermal generation of energy, is prevented, by maintaining a pressure ratio between the thermal water and the $CO_2$ pressure in a nozzle opening,
wherein the discharge flow velocity of the $CO_2$ is controlled while taking into account an absolute value of a flow velocity of the thermal water (2) in a pipeline (12) for conveying the thermal water (2) out of the underground reservoir (3).

15. The apparatus according to claim 14, wherein the lower limit value is in a range from 1.5 to 2.5 m/s.

16. The apparatus according to claim 14, wherein the upper limit value is in a range from 9 to 14 m/s.

17. The apparatus according to claim 14, wherein the discharge flow velocity is controlled while taking at least one of the following properties of the thermal water (2) into account:
   a temperature,
   a pH,
   a composition,
   a pressure.

18. The apparatus according to claim 14, wherein the discharge flow velocity is controlled while taking at least one of the following properties of the nozzle (4) into account:
   a geometry,
   a material,
   surface characteristics.

19. The apparatus according to claim 14, wherein the discharge flow velocity is controlled using the Langelier index of the thermal water (2) as a controlled variable.

* * * * *